Jan. 27, 1970  R. H. WETTERHORN  3,491,598
SHOCK-PROOF INSTRUMENT GAUGE
Filed Sept. 13 1967
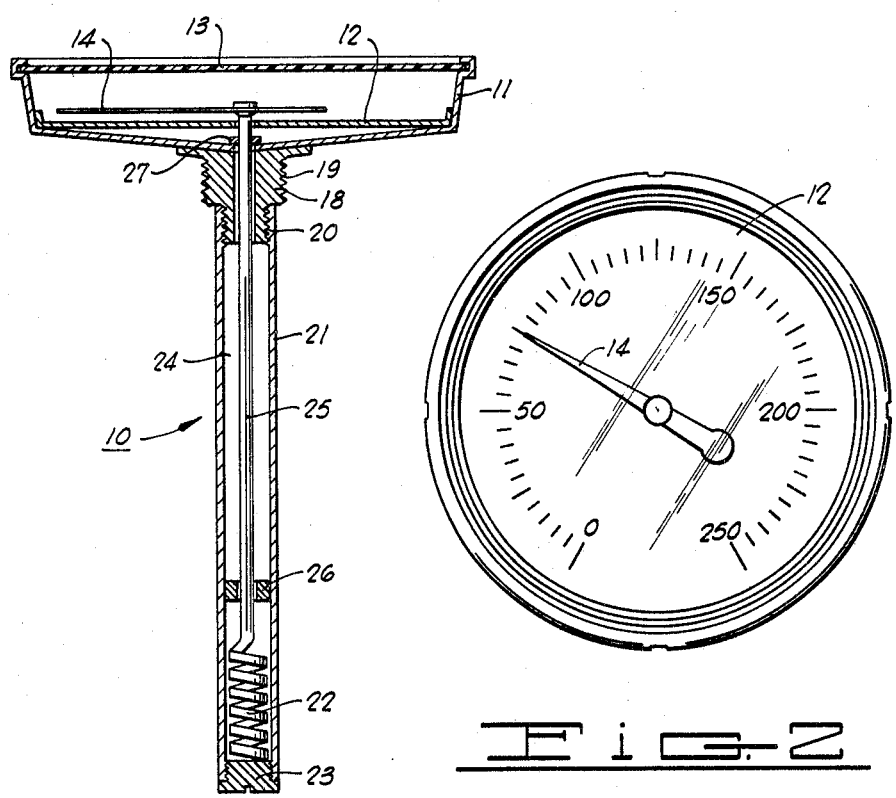
Fig-1
Fig-2
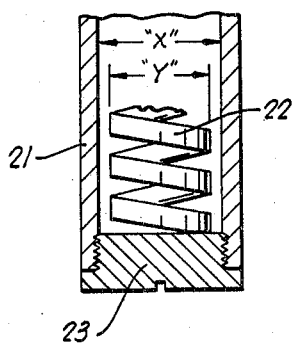
Fig-3
INVENTOR.
RICHARD H. WETTERHORN
BY
ATTORNEY

United States Patent Office 3,491,598
Patented Jan. 27, 1970

1

3,491,598
SHOCK-PROOF INSTRUMENT GAUGE
Richard H. Wetterhorn, Fairfield, Conn., assignor to Dresser Industries, Inc., Dallas, Tex., a corporation of Delaware
Filed Sept. 13, 1967, Ser. No. 667,447
Int. Cl. G01k 5/64
U.S. Cl. 73—363.9                            8 Claims

ABSTRACT OF THE DISCLOSURE

A condition responsive gauge instrument having decreased susceptibility to shock inflicted error for indicating the state of the measured condition. The gauge is suitable for measured indications of pressure and temperature and is constructed within the limitations of critical parameters which enables the withstanding of shock effects imposed by environmental forces external to the condition being measured thereby.

BACKGROUND OF THE INVENTION

The field of art to which the invention pertains includes the art of gauge instrumentation for measuring and testing purposes.

The prior art to which the invention hereof relates includes the art of pressure and temperature gauges adapted for process control and/or measurement and of a type in which the instrument includes an elongated tubular extension containing a sensing element in the form of a resilient helical member supported therewithin. This member may comprise a temperature or pressure sensitive condition responsive element such as a bi-metal coil, Bourdon tube or the like. The element is connected to impose a coiling winding and unwinding force to a rotatable dial pointer or other visual reading means to reflect the state of the condition being measured or controlled. Typical gauges of this sort include those exemplified by Patents 3,096,651; 3,161,057; and 3,283,581 and are marketed commercially by a plurality of manufacturers. The tubular stem on each gauge of this type is supported inserted via a well, port, or other suitable opening in a pipe, duct or the like comprising the condition contained space on which measurement is to be taken. When operating in the manner intended by the manufacturer, these devices are known to provide accurate indications of the space conditions for prolonged operating periods.

Like most scientific instruments, however, these gauges are characteristically fragile in their construction and are not built to withstand rough handling and abuse at least with respect to the sensitive sensing element. It is unfortunate, therefore, that these gauges are occasionally dropped or otherwise abused by service or maintenance personnel prior or during installation. The shock frequently imposed thereby undetectably causes a zero shift in the instrument and which unless the instrument is recalibrated introduces a permanent error in its indicated measurement. Yet further, many situations exist in which the instrument is subjected to substantial environmental vibration, impact or other forms of mechanical shock occasioned by the nature or location of the process system with which the instrument is to be employed.

This can be better appreciated when it is considered that the sensing element extending within the stem is usually of a thin cross-sectional resilient material supported with a freedom of movement to permit its condition response. During shock, therefore, the sensing element being unprotected will impact with the stem walls. If the shock is sufficiently severe as a function of various factors which includes the coil diameter cross-sectional coil thickness, coil elastic limit and modulus of elasticity and the like, the freely supported coil bounces against the stem walls and incurs a permanent deformation. This deformation being usually less than complete destruction of the instrument goes unnoticed since the instrument otherwise appears completely operative but nonetheless introduces a permanent undetected calibration shift in the indicated condition of the measured state.

The instrument inaccuracy caused by mechanical shock has long plagued industry as well as the military. Initial approaches to overcome this difficulty heretofore have included the use of viscous fluids within the gauge stem to dampen the impact of shock below the yield limit of the coiled member. However, while this technique has proved helpful, its uses are limited to temperatures or pressures at which increases in fluid viscosity will not deleteriously affect the freedom of movement of the element therewithin. Accordingly, these fluids usually are of some benefit in the range of approximately —50 to +400° F. However, for measured conditions below or above these range limits, it has heretofore been unknown how to cope with the aforementioned calibration shift resulting from uncontrollable shock effects.

SUMMARY

This invention relates to instrumentation for measuring and testing and in particular to gauge construction having improved resistance to mechanical shock. By means hereof the calibration shift in the control point or visual indicated state of the condition being measured occasioned by mechanical shock which was previously injurious is now substantially avoided. Accordingly, the undesirable set which the condition sensitive element incurred from shock in such prior art devices is substantially overcome by a factor on the order of at least 10 when constructed in accordance and within the parameters discovered by this invention. This, therefore, permits a gauge construction without the need of fluid dampeners as to be usable over extendible ranges not previously possible. By means hereof, this result is achieved by employing critically affecting dimensional parameters of clearance tolerance measured radially between the exterior of the helical element and the interior surface of the tube stem thereabout.

It is therefore an object of the invention to provide a novel gauge construction having reduced susceptibility to the effects of mechanical shock as compared to similar purpose gauges of the prior art.

It is a further object of the invention to provide a novel gauge construction as in the aforementioned object without the necessity of employing shock dampening fluids as to be usable without regard to operational limitations previously imposed by the fluid properties.

BRIEF DESCRIPTION OF THE DRAWINGS

FIGURE 1 is a cross-sectional elevation of a typical instrument gauge constructed in accordance with the invention for the measurement of temperature;

FIGURE 2 is a plan view of the visual dial indicator in the device of FIGURE 1; and FIGURE 3 is an enlarged fragmentary section illustrating the critical parameters of the condition responsive helical coil in relation to the inside wall surface of the tube stem in which it is supported.

With reference now to FIGURES 1 and 2, there is shown a temperature gauge designated 10 by which the instant invention hereof is exemplified. The gauge as herein constructed consists of a cup shaped casing 11 supporting a circular dial 12 enclosed by means of a transparent crystal or window 13. Rotatably supported coaxially above the dial is a pointer element 14 which is displaced in a well known manner as a state function of the measured condition.

Supported extending perpendicular on the underside of the casing is a threaded bore collar 18 having screw threads 19 to enable mounting of the device into the process system with which it is to be employed. Lower threads 20 extending in continuation thereof permits mounting thereto of stem tube 21 having an axial extending bore 24. Near the bottom of the tube, as viewed in FIGURE 1, there is secured the condition responsive element in the form of a helical coil 22 which in this instance is bimetallic, but could be a Bourdon tube or other suitable transmitting element. The coil is anchored at the lower end to a tube plug 23 and at the other end connects either directly as shown or through an intermediate spring as illustrated in U.S. Patent 3,283,581 to a shaft 25. The latter shaft extends coaxial within the tube 21 and collar 18 through axially aligned bearing guides 26 and 27 to support the pointer element 14 for rotative movement with respect to the dial 12. When placed in operative position with tube 21 extending into a well or other suitable location for sensing the fluid condition, coil 22 winds and unwinds in response to fluid temperature changes. The winding movements of the coil are transmitted to pointer element 14 for correlated movement with respect to dial 12.

The invention will now be described with reference also to FIGURE 3 whereby to enable the instrument to better withstand effect of mechanical shock as to avoid a permanent undesirable calibrated offset previously inflicted on the relatively delicate coil element 22. Critical to the construction hereof are the parameter clearance tolerances represented by the coaxial different in diametral dimensions X and Y. Specifically, it has been discovered in accordance herewith that the radial clearance between the exterior surface of coil 22 and the interior surface of tube 21 should not exceed a maximum dimension determined by the maximum unwinding and simultaneous increase in diameter which the helical coil can withstand without exceeding the elastic limit of the coil material. This clearance will vary with the properties of the coil material, cross-section and diameter. While this can be substantially defined theoretically by mathematical equation, the equation will be different for each type of coil structure embodiment. Of course, the theoretical limits should be nearly approached or permitted to govern where feasible and in accord with empirical results. By way of example, this clearance can be theoretically defined mathematically for a conventional bimetal helical coil as follows:

$$C \text{ max.} = ke\frac{do^2}{2Et}$$

where:

C max.=maximum radial clearance.
k=A safety factor taking into account the presence of vibration simultaneously with the shock impact.
e=The elastic limit of the coil material.
do=The mean coil diameter.
E=the modulus of elasticity.
t=The thickness of the coil material.

For stem dimensions of about 5/32 inch to about 3/8 inch, the critical clearance verified empirically for bimetal coils of different diameters and materials is from about 0.001–0.002 inch to about 0.020 inch and slightly above. This increases with diameter with the larger diameter having the greater permissible clearances. Still larger stem dimensions will be permitted still greater clearances in keeping within the critical limitations. For optimum performance, it has been found preferable to maintain the following maximum clearances:

|  | Inch | | |
| --- | --- | --- | --- |
| Stem diameter (O.D.) | 3/16 | 1/4 | 3/8 |
| Stem diameter (I.D.) | 0.147 | 0.199 | 0.320 |
| Clearance (max.) | 0.002 | 0.004 | 0.010 |

Obviously, it is preferable where attainable to achieve a minimum dimension even less than that given to ensure against manufacturing variations. Also, where two coiled elements are series connected as in Patent 3,283,581, the critical clearance should be employed as to both as determined by the maximum attributed to one. For practical reasons, this can be more easily achieved where both coils are of the same exterior outside diameter.

By the above description, there is disclosed a novel improvement in the construction of gauge instruments whereby the ability to endure mechanical shock is substantially enhanced if not completely overcome. Whereas the invention has been principally described in conjunction with a bi-metal helically wound temperature sensitive element, it is to be understood that other elements in the form of a helical coil whether condition responsive or not, such as a spring, Bourdon tube or the like can likewise be assembled in this manner to reduce or eliminate the shock problems inherently existent in similar devices of the prior art. Where desired, the lower interior portion of the tube stem 21 between the underside of bearing 26 and the plug 23 in which the element 22 is contained, may if conditions permit, be filled with viscous fluid such as silicone oil to further reinforce shock impact resistance.

Since many changes can be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. In a condition responsive instrument including a resilient helical member supported extending within a liquidless tubular envelope for winding and unwinding movement therein, the improvement comprising said member being supported with a predetermined maximum radial clearance between the exterior of said member and the interior of said envelope, said clearance being of a dimension generally less than would permit the elastic limit of said helical member to be exceeded in response to mechanical shock imposed on said instrument.

2. The improvement according to claim 1 in which said helical member comprises a temperature sensitive bimetal coil.

3. In a condition responsive instrument including a resilient helical member supported extending within a tubular envelope for winding and unwinding movement therein, the improvement comprising said member being supported with a predetermined maximum radial clearance between the exterior of said member and the interior of said envelope, said clearance being of a dimension generally less than would permit the elastic limit of said helical member to be exceeded in response to mechanical shock imposed on said instrument and of a minimum average dimension of at least 0.001 inch.

4. The improvement according to claim 3 in which said clearance is substantially between the range of 0.001 to 0.020 inch.

5. The improvement according to claim 3 in which said helical member comprises a temperature sensitive bimetal coil.

6. The improvement according to claim 5 in which said envelope has an outside diameter of about 3/16 inch and said clearance is of a dimension up to about 0.002 inch.

7. The improvement according to claim 5 in which said envelope has an outside diameter of about ¼ inch and said clearance is of a dimension up to about 0.004 inch.

8. The improvement according to claim 5 in which said envelope has an outside diameter of about ⅜ inch and said clearance is of a dimension up to about 0.010 inch.

References Cited

UNITED STATES PATENTS 2,365,487　12/1944　Murray _____ 73—363.9

LOUIS R. PRINCE, Primary Examiner

W. A. HENRY II, Assistant Examiner